(12) United States Patent
Ando et al.

(10) Patent No.: US 6,985,489 B2
(45) Date of Patent: Jan. 10, 2006

(54) ATM SWITCH

(75) Inventors: Tatsuhiro Ando, Kawasaki (JP); Yoshihiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 976 days.

(21) Appl. No.: 09/751,983

(22) Filed: Dec. 29, 2000

(65) Prior Publication Data

US 2004/0213242 A1 Oct. 28, 2004

(30) Foreign Application Priority Data

Aug. 4, 2000 (JP) .......................... 2000-237557

(51) Int. Cl.
    *H04L 12/28* (2006.01)

(52) U.S. Cl. .................................... 370/395.5; 370/412

(58) Field of Classification Search ................ 370/412, 370/413, 414, 415, 416, 417, 418, 227, 230, 370/230.1, 231, 232, 235, 395.1, 392, 389, 370/466, 467, 395.3, 395.52, 395.53, 474, 370/395.7, 388, 395.5, 395.4, 395.41
See application file for complete search history.

(56) References Cited

U.S. PATENT DOCUMENTS

| | | | | |
|---|---|---|---|---|
| 6,041,038 A | * | 3/2000 | Aimoto | 370/229 |
| 6,122,252 A | * | 9/2000 | Aimoto et al. | 370/235 |
| 6,144,636 A | * | 11/2000 | Aimoto et al. | 370/229 |
| 6,252,853 B1 | * | 6/2001 | Ohno | 370/242 |
| 6,259,696 B1 | * | 7/2001 | Yazaki et al. | 370/395.21 |
| 6,333,917 B1 | * | 12/2001 | Lyon et al. | 370/236 |
| 6,434,153 B1 | * | 8/2002 | Yazaki et al. | 370/395.21 |
| 6,477,166 B1 | * | 11/2002 | Sanzi et al. | 370/395.1 |
| 6,538,989 B1 | * | 3/2003 | Carter et al. | 370/229 |
| 6,606,318 B2 | * | 8/2003 | Katsube et al. | 370/392 |
| 6,628,649 B1 | * | 9/2003 | Raj et al. | 370/360 |
| 6,671,258 B1 | * | 12/2003 | Bonneau | 370/235 |
| 6,714,547 B1 | * | 3/2004 | Fujita | 370/395.52 |

FOREIGN PATENT DOCUMENTS

JP  10-013427  1/1998

\* cited by examiner

*Primary Examiner*—Chau Nguyen
*Assistant Examiner*—Ricardo Pizarro
(74) *Attorney, Agent, or Firm*—Katten Muchin Rosenman LLP

(57) ABSTRACT

In an ATM switch provided in a network where an MPLS traffic and an ATM traffic coexist, which of the MPLS traffic and the ATM traffic a received ATM cell belongs to is determined according to the cell, the cell is classified based on the determination result and made to wait, and the cell is read at read intervals based on preset bandwidth allocation rates of both traffics. Also, service classes of a plurality of priorities for the MPLS traffic are provided and the read interval is obtained per priority.

6 Claims, 14 Drawing Sheets

| ENTRY NO. | VPI | VCI | SERVICE QUEUE NO. |
|---|---|---|---|
| 0 | 15 | 13 | $Q_4$ |
| 1 | 21 | 19 | $Q_6$ |
| ⋮ | ⋮ | ⋮ | ⋮ |

ATM SWITCH

BACKGROUND OF THE INVENTION

1. Field of the Invention

The present invention relates to an ATM switch, and in particular to an ATM switch provided in a network where traffics of an MPLS (Multi Protocol Label Switching) service and an ATM (Asynchronous Transfer Mode) service coexist.

An ATM technology has been developed as one for constructing a B-ISDN (broadband integrated services digital network) of a next generation. Also, in the Internet which is rapidly expanding at present, the ATM technology capable of offering a quality of service (QoS) is being remarked.

2. Description of the Related Art

FIG. 13 shows a system which is constructed by applying an ATM technology which can offer a quality of service (QoS) to an ATM network as a backbone network accommodating a WAN (Wide Area Network).

In FIG. 13, an ATM network 20 is connected to the Internet and an LAN (Local Area Network) through edge LSR's (Label Switching Routers) 30. In the ATM network 20, ATM switches 50 are provided which are connected to an ATM terminal 40 or the like to transfer an ATM cell.

The edge LSR's 30 have an MPLS function which is one of label switching technologies as means for internetworking the Internet and the LAN with the ATM network 20.

This label switching function is a technology to transfer packets at a high speed without performing a normal routing process by allocating a label to a serial flow of packets and establishing a path from a starting point to an end point. By using such a label switching function a mapping of an IP packet to an ATM cell becomes possible.

Therefore, the IP packet from the Internet is converted into data of the MPLS at the edge LSR 30 and mapped to the ATM cell to be outputted. This cell is transmitted to the ATM switch 50, so that it becomes possible to perform data transfer in the same way as the ATM cell from the ATM terminal 40.

Therefore, it is also possible to call the ATM network 20 in this case the MPLS network. Both are occasionally distinguished from each other respectively as "native ATM network" and "non-native ATM network".

FIG. 14 shows a schematic system arrangement of the ATM switch 50 shown in FIG. 13, which is composed of line interfaces 1 on the input side and output side, a switch matrix SW for switching a flow of data cells towards these line interfaces 1, and a call processor CP for controlling operations of the switch matrix SW and the line interfaces 1. The call processor CP performs connection settings ② and ④ to the line interfaces 1 by a connection setting demand in an MPLS (LDP) message from the edge LSR 30 or an ATM signaling message ① from the ATM terminal 40, and performs a control ③ over the switch matrix SW so that data (cells) can pass through an appropriate output line from the line of the input side.

As shown in FIG. 13, there has been no specific bandwidth control technology in the prior art when the MPLS traffic and the ATM traffic coexist in the ATM network 20.

Also, although it has been possible to provide the ATM traffic with a plurality of priorities (as will be described referring to FIG. 2), it has not been possible to provide the MPLS traffic with a plurality of priorities.

Namely, as shown in FIG. 15, when it is attempted to categorize the MPLS traffic according to the priorities into service categories of the ATM cell such as a CBR, a VBR, and a UBR for mapping into QoS field in the cell, there is no other choice than selecting the UBR which offers a best effort service, in order to transfer the IP packet within the ATM network 20 after embedding an area indicating a plurality of priorities of ToS (Type of Service) and the like such as a Diffserv and an Intserv of the IP packet into the area (service class: Class of Service) indicating priorities in the MPLS.

Therefore, since the priority is not considered in the UBR, it has not been possible to provide a plurality of priorities such as CoS1 and CoS2 as shown in FIG. 15 so that it has been disadvantageous that the quality of service (QoS) upon the mapping to the ATM traffic is not guaranteed.

SUMMARY OF THE INVENTION

It is an object of the present invention to realize, in an ATM switch which is provided in a network where an MPLS traffic and an ATM traffic coexist, a bandwidth control of both traffics and to provide the MPLS traffic with a plurality of priorities.

For the achievement of the above object, the ATM switch according to the present invention comprises a line interface having determination means for determining, according to a received ATM cell, which traffic the cell belongs to, queuing means for queuing the cell classified based on a determination result of the determination means, and read means for reading the cell from the queuing means at read intervals based on bandwidth allocation rates of both traffics preset by the call processor.

Namely, in the line interface of the present invention, the determination means determine whether the received ATM cell belongs to the MPLS traffic or the ATM traffic, and classify the received ATM cell to be kept waiting in queuing means based on this determination result.

Then, the read means read the ATM cell from the queuing means at the read intervals based on the bandwidth allocation rates of both traffics preset by the call processor.

Thus, by distributing the bandwidths to the MPLS traffic and the ATM traffic at the preset allocation rates, the cells of the MPLS traffic and the ATM traffic are read out of the queuing means in the form corresponding to the bandwidth allocation rates, so that it becomes possible to perform a bandwidth control at the bandwidth allocation rates set by an operator.

In the above-mentioned case, the read means may read, in the absence of one of the two traffics, the cell of the other traffic. Thus, it is possible to make the bandwidth which is unused by one service to be used by the other service.

Also, the call processor may perform a connection admission to read the cell only when a total of a bandwidth demanded by a connection to be newly admitted for the MPLS traffic and a present bandwidth exceeds a bandwidth determined by the allocation rates, and reject the connection admission in other cases (claim 1).

Namely, the rejection of the connection admission prevents the allocated bandwidth determined by the bandwidth allocation rate as described above from being changed by the newly admitting connection.

Moreover, the call processor may perform a connection admission to read the cell unrestrictedly regardless of a bandwidth demanded by a connection to be newly admitted for the MPLS traffic (claim 2).

Namely, upon providing the MPLS traffic as described above, the bandwidth allocation by the allocation rate is performed. However, by eliminating the bandwidth control per connection and admitting the connection unrestrictedly, it becomes possible to reduce the load of the call processor.

Moreover, the queuing means can have service classes of a plurality of priorities for the traffics, and the call processor may provide a bandwidth allocation rate varied per priority for the ATM traffic and a bandwidth allocation rate common to each priority for the MPLS traffic (claim 3).

Namely, when the MPLS traffic and the ATM traffic coexist, by providing classes of a plurality of priorities and performing the above-mentioned bandwidth control per priority, it is possible to secure the bandwidths in the order of higher priority service class.

In this case, the call processor may set the bandwidth allocation rates so that a total of the bandwidth allocation rates for the priorities exceeds 1 (claim 4). Therefore, it becomes possible to transfer the cell of the next priority after completing the cell transmission of the highest priority service class for example.

Also, the call processor may set the above-mentioned bandwidth allocation rates so that a total of the bandwidth allocation rates for the priorities becomes 1 (claim 5). Thus, it becomes possible to perform the bandwidth allocation to each priority completely according to the allocation rates.

Moreover, the read means may read the cell according to another priority when the read interval is not reached in any of the service classes (claim 6).

BRIEF DESCRIPTION OF THE DRAWINGS

Throughout the figures, like reference numerals indicate like or corresponding components.

DESCRIPTION OF THE EMBODIMENTS

Figure 1:
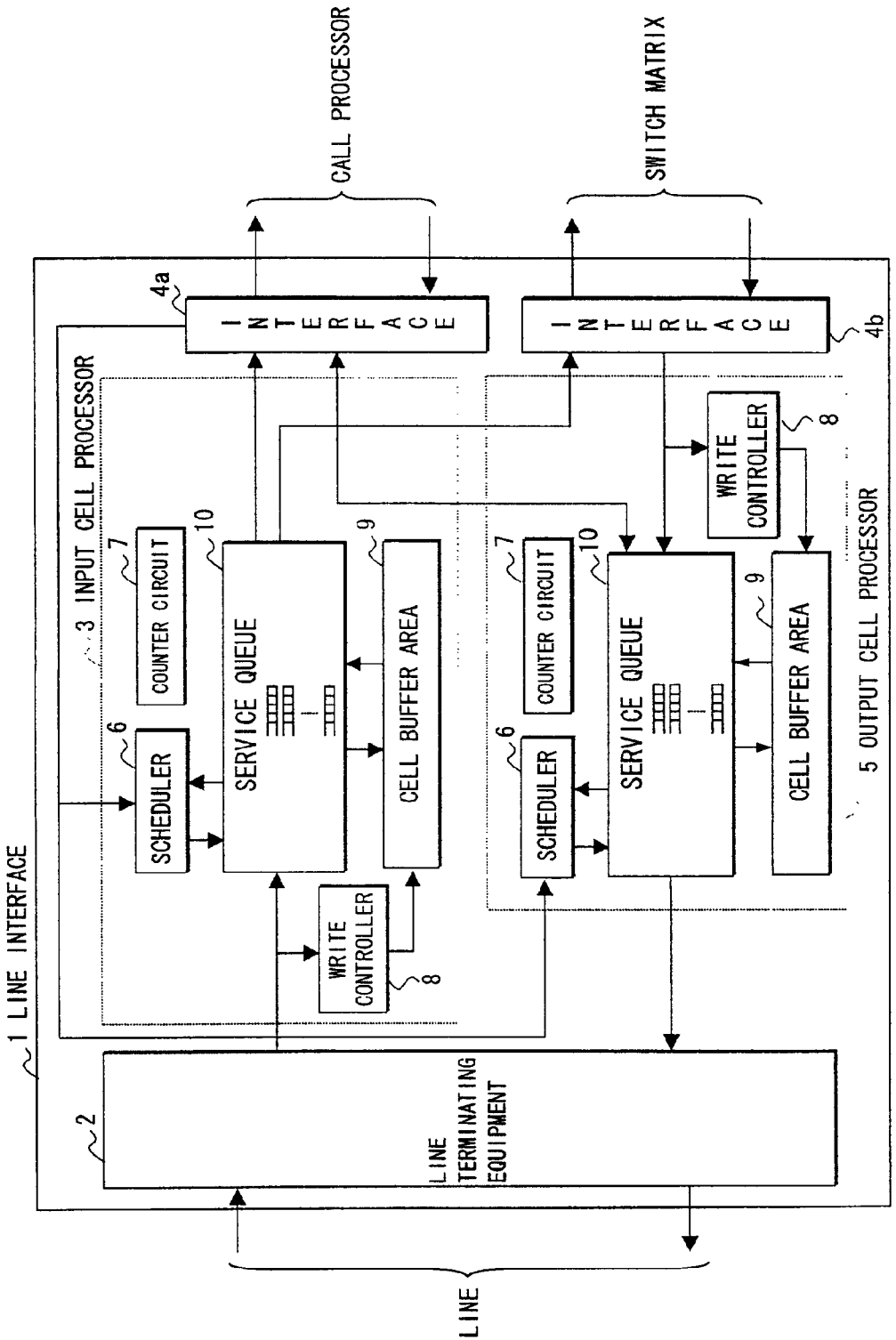
FIG. 1 is a block diagram illustrating an embodiment of a line interface in an ATM switch according to the present invention.
Figure 14:
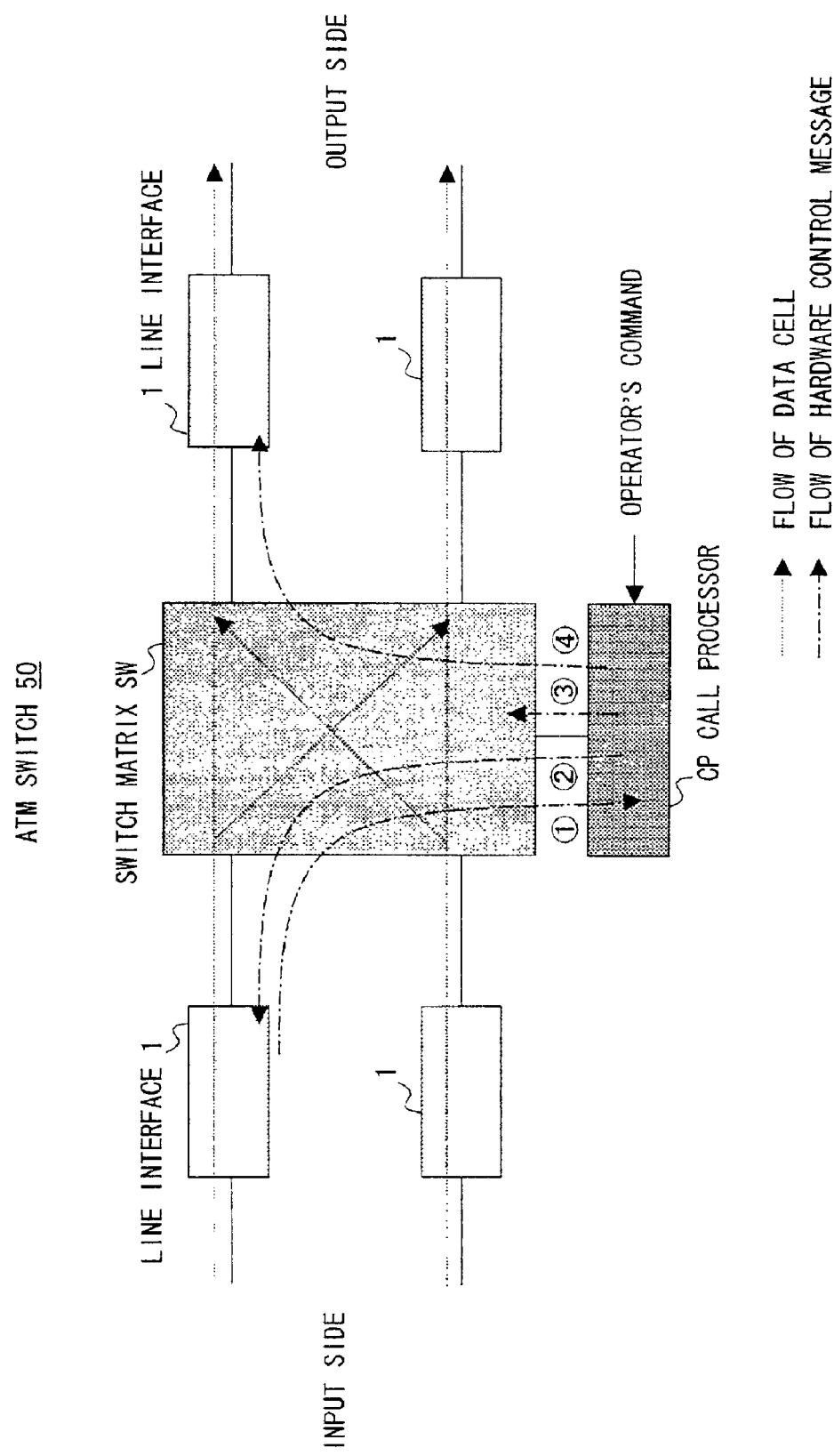
FIG. 14 is a schematic block diagram illustrating a general system arrangement of an ATM switch.
Figure 15:
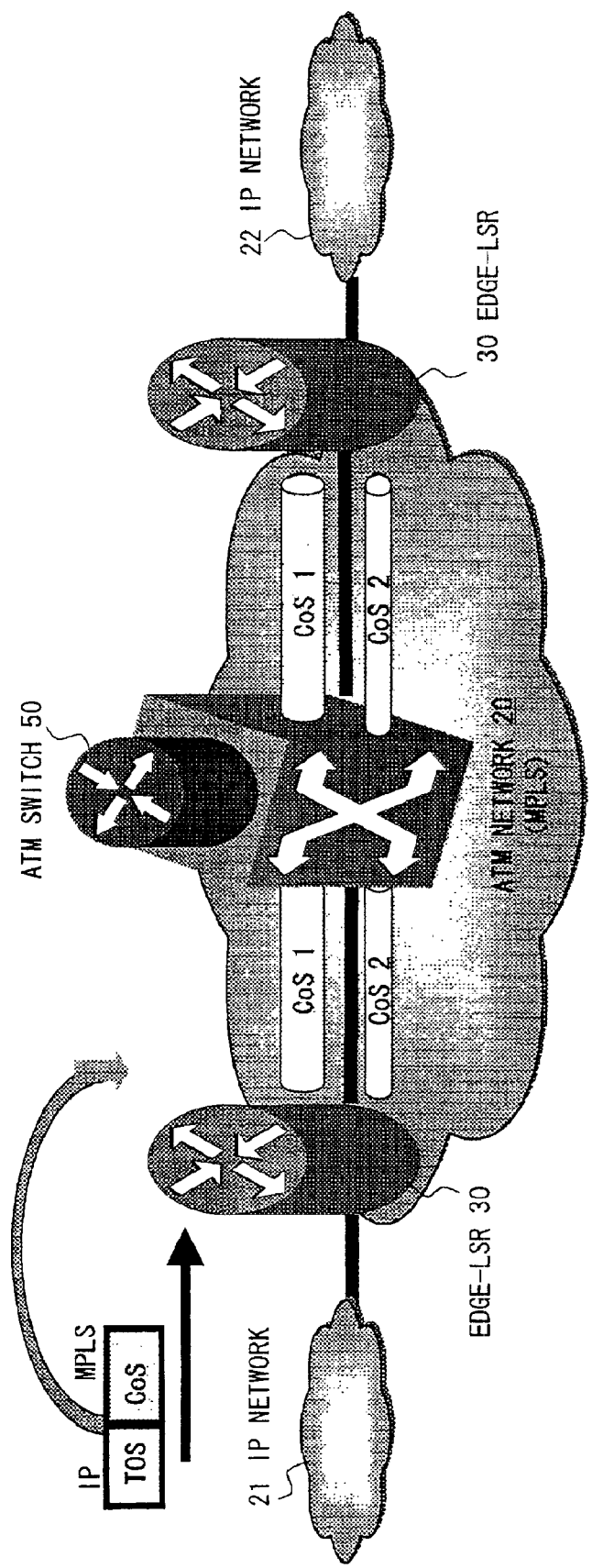
FIG. 15 is a diagram (2) illustrating a network arrangement when priorities of an MPLS traffic are used for the network shown in FIG. 13.

FIG. 1 shows an embodiment of a line interface 1 in an ATM switch according to the present invention, which corresponds to the line interfaces 1 in the ATM switch described referring to FIG. 14.

In this embodiment, the line interface 1 is composed of a line terminating equipment 2 for terminating a physical layer to extract an ATM cell, an input cell processor 3 for processing the ATM cell extracted at the line terminating equipment 2, an interface 4a connected between the input cell processor 3 and a call processor (see FIG. 14), an interface 4b connected to a switch matrix (see FIG. 14), and an output cell processor 5 connected between the interface 4b and the line terminating equipment 2. The interfaces 4a and 4b also serve as interface functions to the output cell processor 5 and the input cell processor 3, respectively.

Also, the input cell processor 3 is composed of a scheduler 6, a counter circuit 7, a write controller 8, a cell buffer area 9, and a service queue 10. The scheduler 6 is connected to the interface 4a, the counter circuit 7, and the service queue 10. The write controller 8 is connected between the line terminating equipment 2 and the cell buffer area 9. The service queue 10 is connected to the line terminating equipment 2, the cell buffer area 9, and the interfaces 4a and 4b.

It is to be noted that the scheduler 6 and the counter circuit 7 compose the read means. The write controller 8, the cell buffer area 9, and the service queue 10 compose queuing means.

The output cell processor 5 has the same arrangement as the input cell processor 3 except that the write controller 8 is connected between the interface 4b and the cell buffer area 9, and that the service queue 10 transmits the ATM cell from the output cell processor 5 to the line terminating equipment 2.

Figure 2:
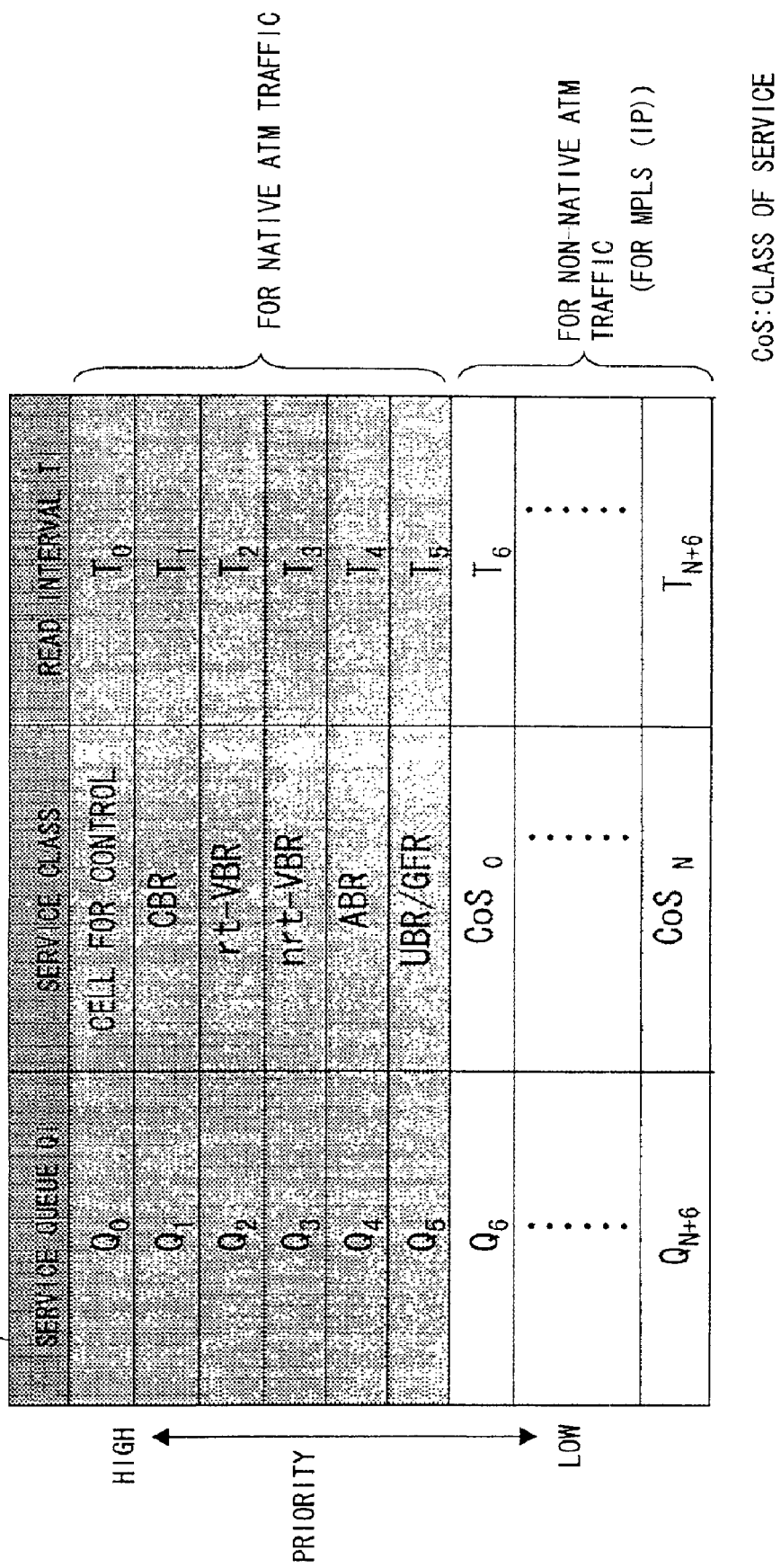
FIG. 2 is a diagram illustrating an embodiment of a service queue used in an ATM switch according to the present invention.

FIG. 2 shows an embodiment of the service queue 10 shown in FIG. 1 which is composed of N+6 service queues $Q_0$–$Q_{N+6}$. The service queues $Q_0$–$Q_5$ are allocated to service queues for the native ATM traffic, namely the original ATM traffic.

Specifically, as shown in FIG. 2, the service queue $Q_0$ is allocated to the service class of a cell for control, the service queue $Q_1$ to a CBR, the service queue $Q_2$ to an rt-VBR, the service queue $Q_3$ to an nrt-VBR, the service queue $Q_4$ to an ABR, and the service queue $Q_5$ to an UBR/GFR.

Also, the service queues $Q_6$–$Q_{N+6}$ are allocated to the non-native ATM traffic, that is the service queue for the MPLS(IP). The service queue $Q_6$ is allocated to a service class $CoS_0$, and the service queue $Q_{N+6}$ is likewise allocated to a service class $CoS_N$.

In this embodiment, priorities are set higher as the upper part of the figure is approached as shown in FIG. 2.

Figures 3, 4:
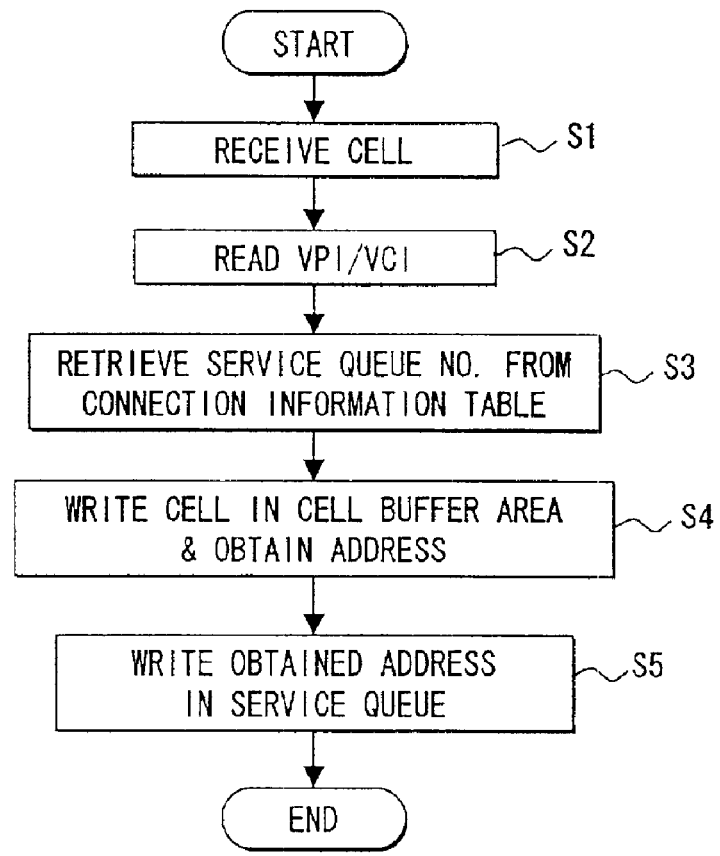
FIG. 3 is a flow chart illustrating a procedure of a write controller used in an ATM switch according to the present invention.
FIG. 4 is a diagram illustrating a connection information table provided in a write controller used in an ATM switch according to the present invention.

How an input ATM cell gets mapped to each service class of the service queue 10 will be described herebelow referring to FIG. 3 showing a process flow of the write controller 8 as well as FIG. 4 showing a connection information table preliminarily provided in the write controller 8.

First of all, the write controller 8, upon receiving the ATM cell from the line terminating equipment 2 (at step S1 of FIG. 3), reads a "VPI/VCI" in the ATM cell (at step S2) and retrieves a service queue number from the connection information table shown in FIG. 4 based on the service class for the MPLS embedded in the VPI/VCI (at step S3). For example, if VPI/VCI=21/19, the service queue number $Q_6$ will be retrieved.

Then, the write controller 8 writes the cell in the cell buffer area 9 and obtains the address (at step S4), and writes the obtained address in the service queue 10 (at step S5).

Next, a control procedure of the scheduler 6 when reading the ATM cell queued in the cell buffer area 9 and service queue 10 will be described herebelow.

First of all, as shown in FIG. 2, $T_0$–$T_{N+6}$ are respectively set as read intervals Ti in the service queues $Q_0$–$Q_{N+6}$ by the call processor CP, which will be described later, so that the read control in the service queue 10 is to be performed based on the read interval Ti.

Figure 5:
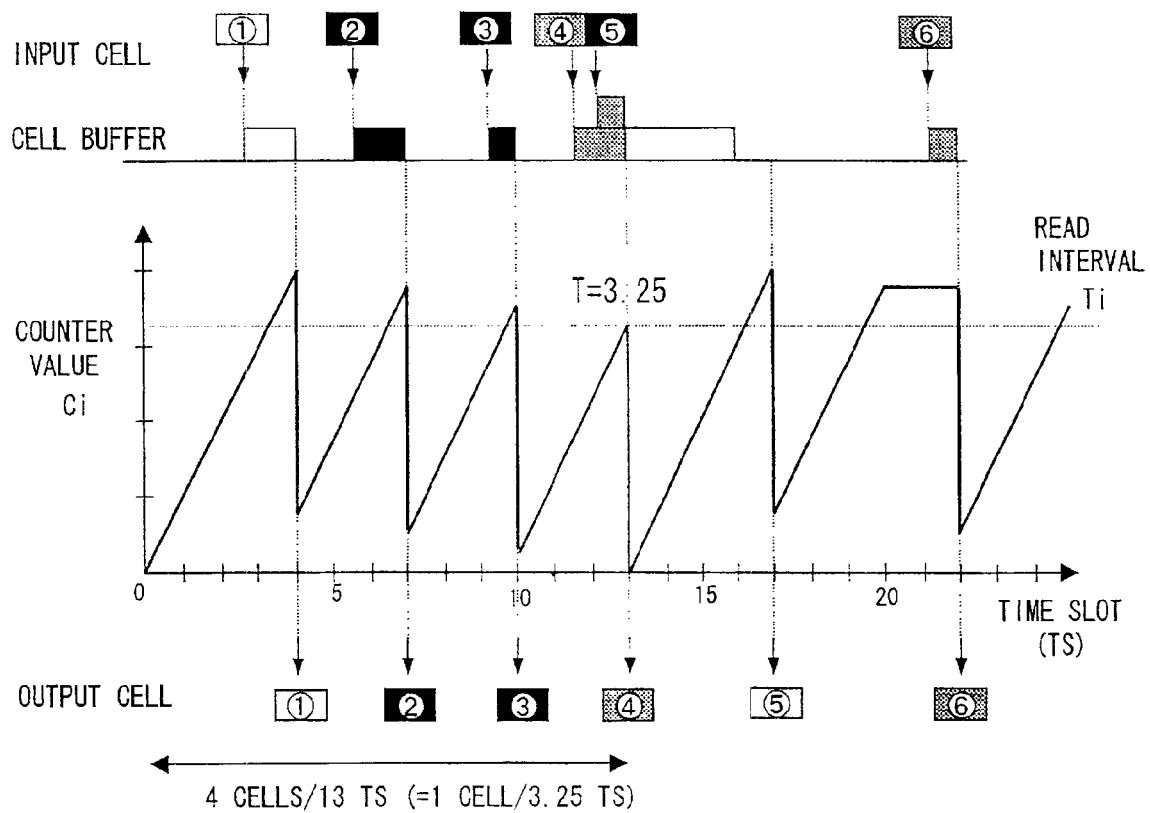
FIG. 5 is a time chart illustrating a scheduling example when cells are read out of a service queue of an ATM switch according to the present invention.

To begin with, how an ATM cell is read out of the service queue 10 will be schematically described referring to a time chart shown in FIG. 5.

The vertical axis Ci in FIG. 5 shows counter values after the counter circuit 7 shown in FIG. 1 read the cell out of the previous service queue 10. The horizontal axis shows time slots (TS) indicating time elapsed. Also, in the example of FIG. 5, it is assumed that the read interval Ti=3.25 is set as a threshold value.

The scheduler 6 always monitors the counter value Ci of the counter circuit 7 and reads the input cell ① at the time the counter value Ci becomes 4 (at the time slot TS=4) since the read interval Ti exceeds 3.25 as shown in FIG. 5.

When the reading is finished, the scheduler 6 decreases the counter circuit 7 by Ti=3.25 in order to watch the read timing of the next cell. It is assumed that the counter circuit 7 can count below the decimal point. Also, if the counter circuit 7 is decreased by "4", the reading will be made at a substantial interval of "4" since the elapsed time will return to "0", so that the reading will not be made at the read interval of 3.25.

Thus, after reading the cell ①, the counter circuit 7 increases again and an input cell ② is read at the time when Ti exceeds 3.25 (at time slot TS=7).

Such operations are performed per time slot TS=3. After reading a cell ④ at the time slot TS=13, the counter circuit 7 starts counting up again as in the beginning since the count value becomes "0".

Although an input cell ⑤ also exists at the time slot TS=13, only the cell ④ is read since it is not possible to read two cells at a time when the read timing from one service class and the read timing (TS) from another service class coincide, so that the reading is performed preferentially from a higher priority of the service class (for example, in the order of a smaller service queue number in FIG. 2).

When the read interval Ti exceeds 3.25 at the time slot TS=17, the input cell ⑤ is read.

Therefore, during the time slots TS=0–13, 4 cells are read, so that it is understood that the read interval averaged at 13/4=3.25 is achieved.

Also, as shown at the time slots TS=17–20, in case there is no input cells even if the read interval Ti exceeds 3.25, naturally, no cells can be read. In this case, the counter circuit 7 is stopped in operation.

Otherwise, if cells arrive at a certain time in large quantities from a service queue which has no flow of cells for a long time, the cells of the service queue are read all together, so that cell reads out of other service queues are obstructed.

Figure 6:
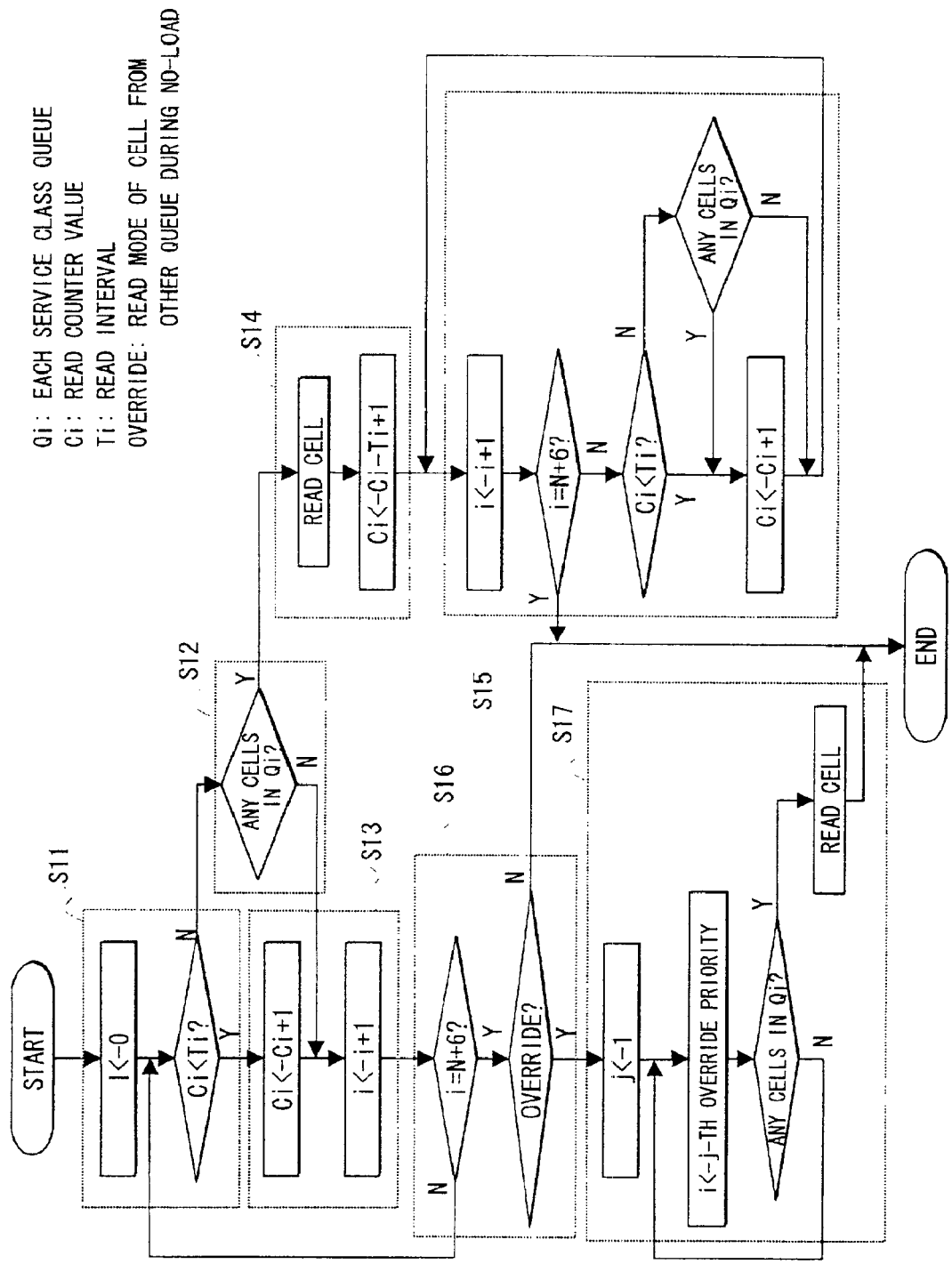
FIG. 6 is a flow chart illustrating an algorithm for reading cells out of each queue by a scheduler used in an ATM switch according to the present invention.

The flow chart of FIG. 6 specifically shows such a read control shown in FIG. 5. This flow chart performed by the scheduler 6 per time slot TS of FIG. 5 will be described herebelow in large sections of steps S11–S17.

Step S11:

First of all, at every time point (time slot), it is checked whether or not a cell read timing from the service queue $Q_0$ has come. Namely, the cell read process is performed starting from the service queue $Q_0$ until the service queue $Q_{N+6}$ shown in FIG. 2. At first, since i=0, it is determined whether $C_0 < T_0$, namely, whether or not the elapsed time $C_0$ where the cell for control, which is the service class for the service queue $Q_0$, is counted at the counter circuit 7 is smaller than the preliminarily allocated read interval $T_0$, which will be performed per time slot by incrementing "i" sequentially.

Step S12:

When the cell read timing has come, namely, when equal to or longer time than the read interval has elapsed ($C_i \geq T_i$), it is determined whether or not a cell is waiting in the service queue.

Step S13:

When the cell read timing has not come at step S11 ($C_i < T_i$), or when the read timing has come ($C_i \geq T_i$) but no cell is waiting, the count value $C_i$ of the counter circuit 7 is incremented by "1" and the service queue number is also incremented by "1" to proceed to the next service queue.

Step S14:

Only when the read timing has come ($C_i \geq T_i$) and the cell is waiting, the cell can be read out of the service queue. Subtraction of the read interval $T_i$ from $C_i$ is performed as having described referring to FIG. 5. Also, in order to prepare for the next read timing, Ci is incremented by "1".

Step S15:

When the cell is read at Step S14, "i" indicating the priority is counted up so that the elapsed time $C_i$ is counted up for "i" of a bigger value, namely for the service queue of a lower priority. When at that time the counter circuit 7 exceeds the read interval $T_i$ ($C_i \geq T_i$), the counter circuit 7 is counted up if there is a cell to be read, while the counter is left unchanged if there is no cell to be read. This corresponds to the time slots TS=20–22 in FIG. 5. When the process is finished for all of the service queues from i=0 to i=N+6, all of the cell read processes at that time are finished.

Step S16:

Upon finishing checking all of the service queues at the above mentioned step S13 without cell being read (when "i"=N+6), the process moves on to an override mode as a next process.

However, since this mode is not necessarily performed compulsorily as a system, it is checked at first whether or not to perform the override. If the override is not performed, all of the cell read procedures at that time are finished.

Step S17:

When the override is performed, another priority "j" is used here instead of using the service queues $Q_0$–$Q_{N+6}$ for the priory. Namely, whether or not a cell is waiting is checked sequentially from j=1. A cell is read out of the service queue if the cell is waiting. The queue of the next priority (j+1) is checked if no cell is waiting.

The calculation method of the above-mentioned read interval Ti will now be described.

Figure 7:
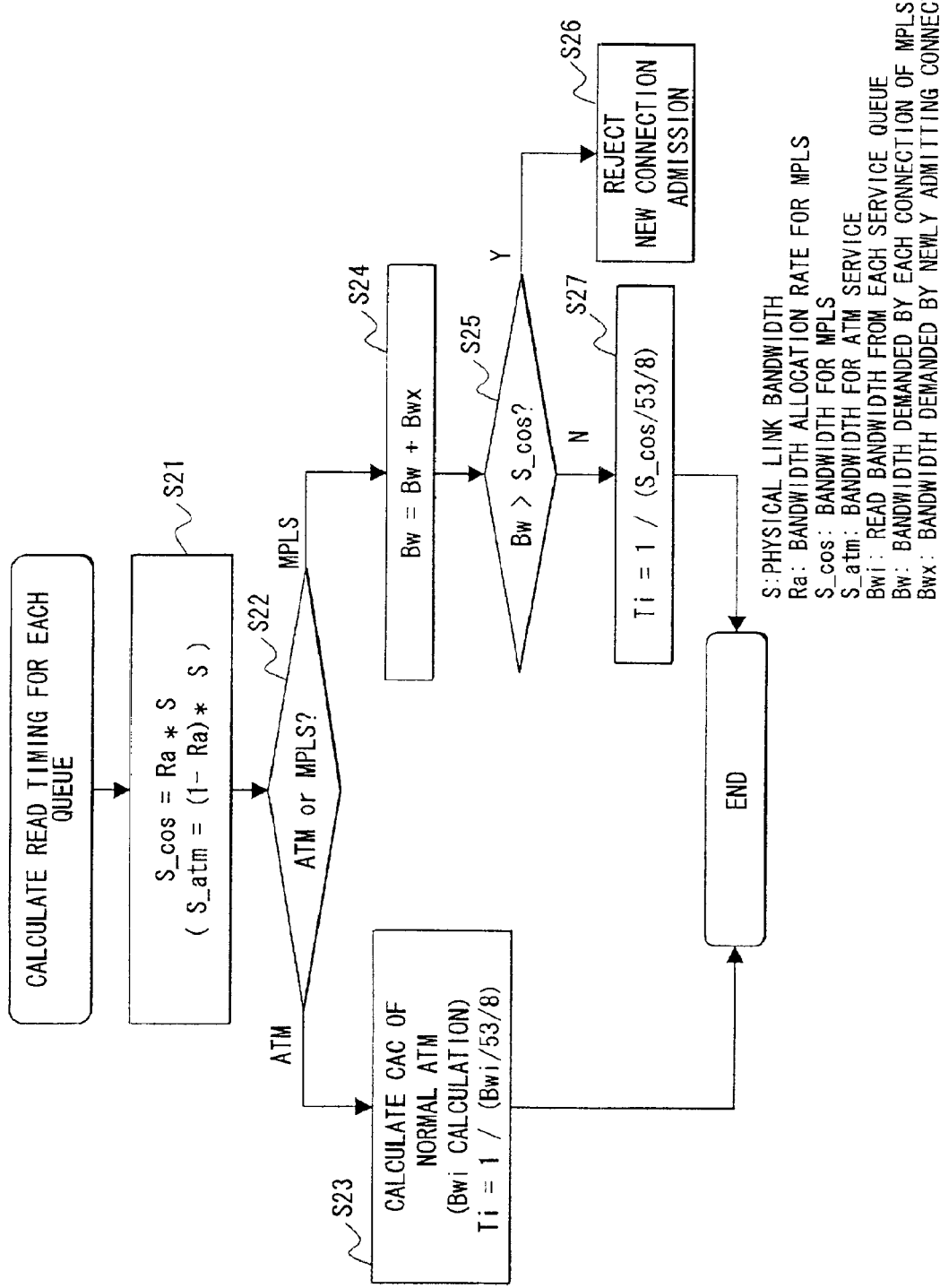
FIG. 7 is a flow chart illustrating an algorithm example (1) for a cell read interval calculation by a call processor used in an ATM switch according to the present invention.

FIG. 7 shows an algorithm example (1) of the cell read interval calculation. This calculation is performed in the call processor CP shown in FIG. 14 before the above-mentioned read operation (for example at the time of a connection establishment). The object of the calculation is to divide the bandwidth for the native ATM traffics such as the CBR and the VBR and the non-native ATM traffics such as the MPLS to perform an admittance determination when a new connection is admitted.

In FIG. 7, the entire bandwidth is referred to as "S" in the first place, so that for this bandwidth S, the MPLS (non-native ATM) traffic is provided with the bandwidth (Ra×S) at the allocation rate "Ra" (at step S21).

As a result, the remaining bandwidth [(1−Ra)×S] is provided to the native ATM traffic. Within the bandwidth, the admission control of the new connection (whether or not a bandwidth for admitting a new connection can be secured) is performed respectively.

Next, the read interval Ti is calculated separately for the ATM service or the MPLS service (at step S22).

In case of the ATM traffic, a CAC (Call Admission Control) mounted on the normal ATM switch is performed to calculate the required read bandwidth Bwi for each service queue, and to calculate the read interval Ti for each service queue from the read bandwidth Bwi (at step S23). It is to be noted that a known algorithm can be used for the calculation of the read bandwidth Bwi.

In case of the MPLS traffic, a total Bw of the required bandwidths including the new connection is calculated by adding a bandwidth Bxw demanded when the new connection is admitted to the total Bw of the bandwidths of all of the connections already admitted (at step S24).

In case the calculated required bandwidth Bw is larger than the bandwidth S_cos allocated for the MPLS traffic (at step S21), the call processor CP rejects the admission of the new connection (at step S26).

Then, the read interval Ti for the service queue for the MPLS is calculated by using the allocated bandwidth S_cos (at step S27).

It is to be noted that if there is only one service queue for the MPLS, the required read bandwidth always becomes S_cos while if there are a plurality of service queues for the MPLS, the required read bandwidth and the read interval common to each queue are always calculated.

Figure 8:
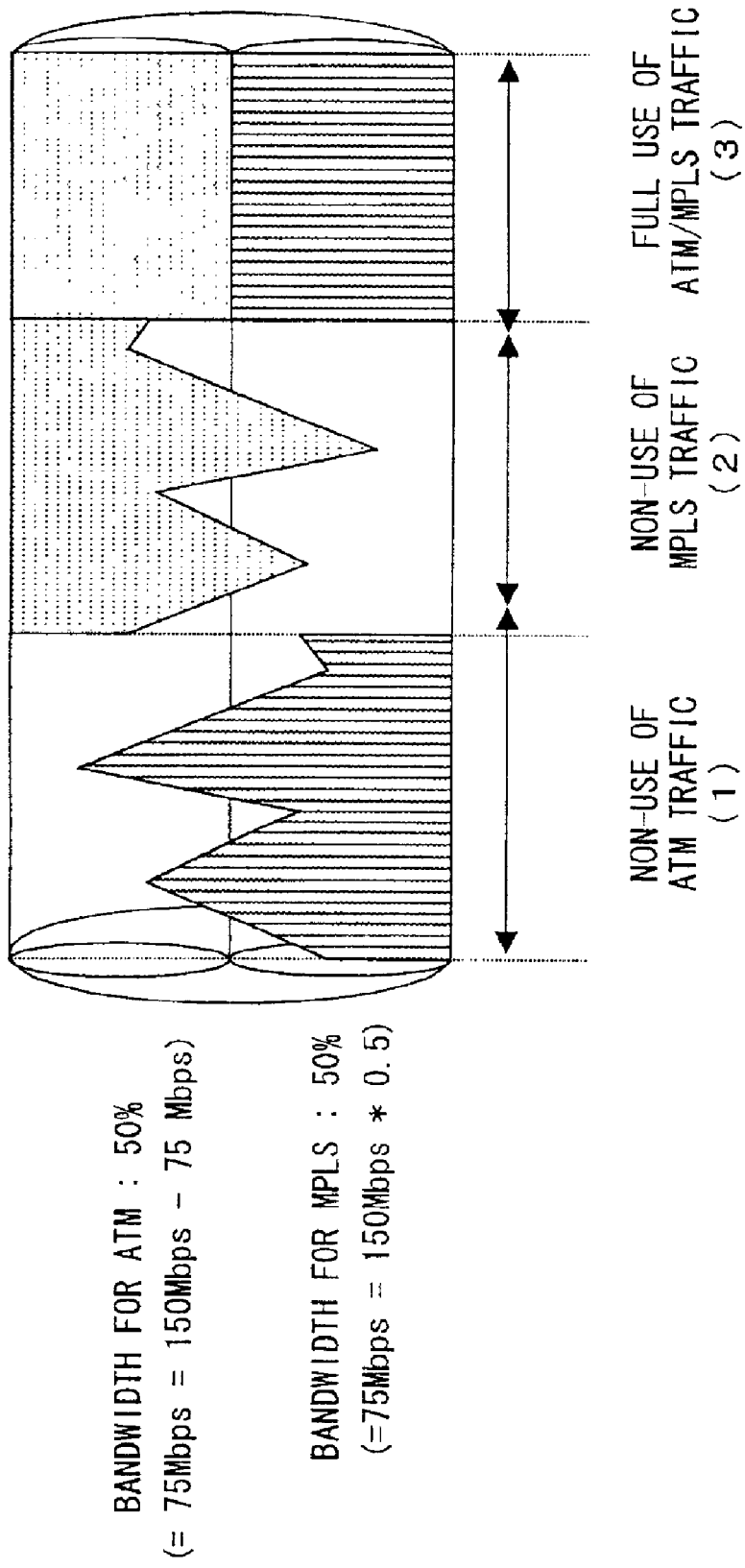
FIG. 8 is a diagram illustrating a usage example (1) of a bandwidth for an ATM traffic and an MPLS traffic in an ATM switch according to the present invention.

FIG. 8 shows a bandwidth setting example when the bandwidth allocation rate is set to Ra=0.5 in FIG. 7.

In this example, the bandwidth allocations for the ATM traffic and the MPLS traffic are 50% respectively as shown by (3) in FIG. 8, so that it is understood that the bandwidth becomes 75 Mbps. However, as shown by (1) or (2) in FIG. 8, it is understood that when one of the traffics has no-load (unused), the other traffic can freely use it.

This is because in FIG. 6, when there is no input cell even if the process proceeds from step S11 to step S12, "i" is incremented at step S13 so that these steps S11–S13 are repeated. When the ATM traffic is unused as shown by (1) in FIG. 8, since there is no input cell for the service queues $Q_0$–$Q_5$ for the native ATM shown in FIG. 2, reading of only the service queues for the MPLS $Q_6$ and the following is performed. This is likewise applied to the contrary case where the MPLS traffic is unused as shown by (2) in FIG. 8.

Figure 9:
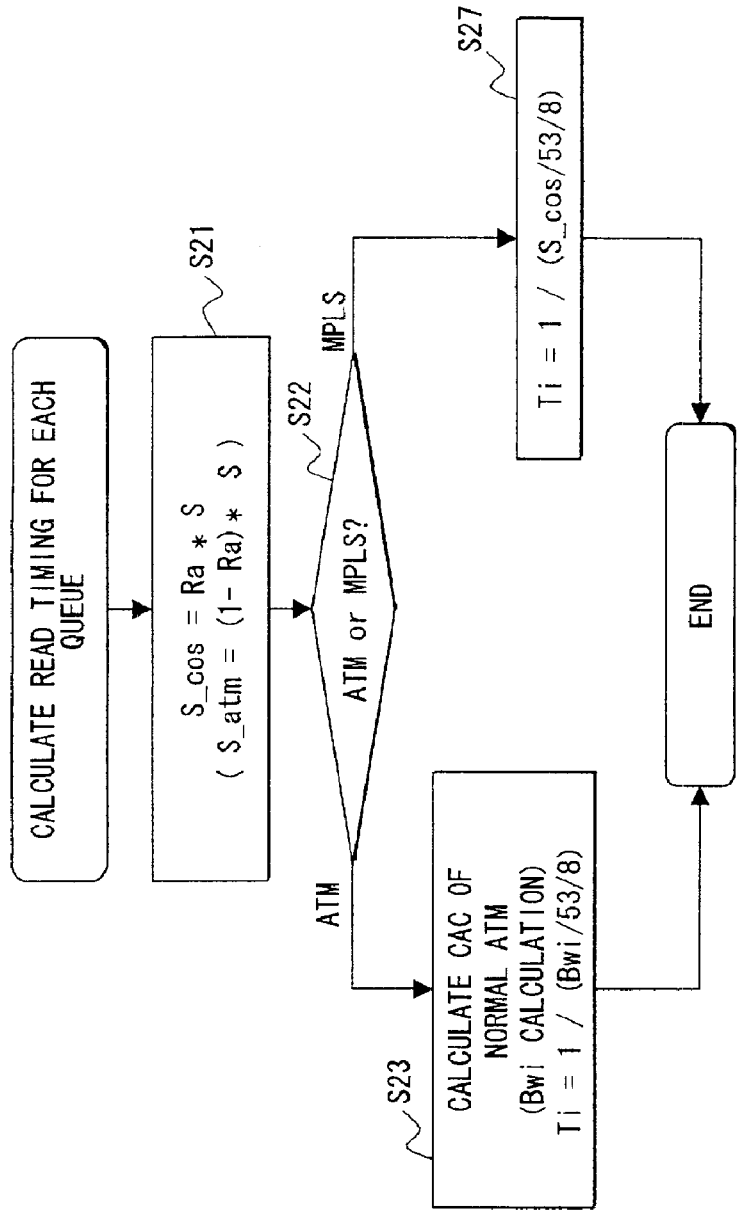
FIG. 9 is a flow chart illustrating an algorithm example (2) for a cell read interval calculation by a call processor used in an ATM switch according to the present invention.

FIG. 9 shows an algorithm example (2) of the cell read interval calculation. The difference between this algorithm example (2) and the algorithm example (1) shown in FIG. 7 is that steps S24–S26 in FIG. 7 are deleted.

Namely, in the algorithm example (1) of FIG. 7, if the allocated bandwidth is exceeded as a result of adding the bandwidth demanded by the new connection to the bandwidth hitherto, the admission of the new connection is rejected to keep the bandwidth of the present connection from being reduced. However, in case of the algorithm example (2) of FIG. 9, the bandwidth control per connection is eliminated to admit connection unrestrictedly, so that the load of the call processor accompanying the admission control is decreased.

Therefore, in case of the algorithm example (2), the allocated bandwidth for each connection is allowed to be reduced.

Figure 10:
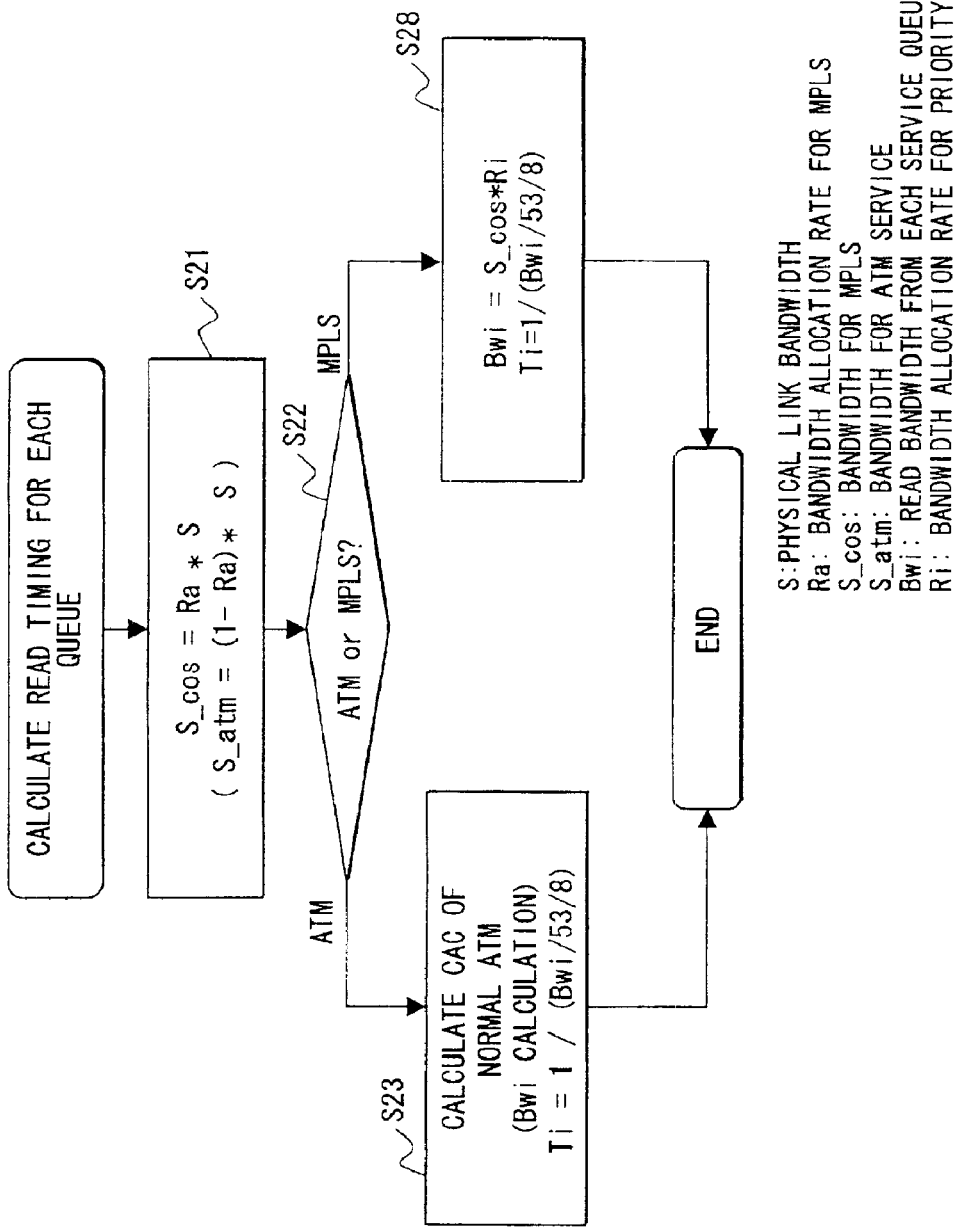
FIG. 10 is a flow chart illustrating an algorithm example (3) for a cell read interval calculation by a call processor used in an ATM switch according to the present invention.

FIG. 10 shows an algorithm example (3) of the cell read interval calculation. The difference between this algorithm example (3) and the algorithm example (1) shown in FIG. 7 is that step S28 is used instead of steps S24–S27 of the algorithm example (1) shown in FIG. 7.

Namely, although in the above-mentioned algorithm examples (1) and (2) the service queue for the MPLS is not necessarily assumed to be provided in plurality, in case of this algorithm example (3), it is shown that the service queues are provided for a plurality of priorities "i", so that the bandwidth Bwi=S_cos×Ri for each priority "i" is obtained by multiplying the bandwidth S_cos for the MPLS by the bandwidth allocation rate Ri for each priority "i", and the read interval Ti is obtained likewise as step S23.

Therefore, in the embodiment of FIG. 2, the service class N for the MPLS can be extended to maximum of 8 classes and a total of 14 classes of service queues can be used.

There is a possibility that the bandwidth allocation rate Ri used in the algorithm example (3) shown in FIG. 10 permits a total (ΣRi) for all priorities to exceed "1" or to be fixed as "1".

Figure 11:
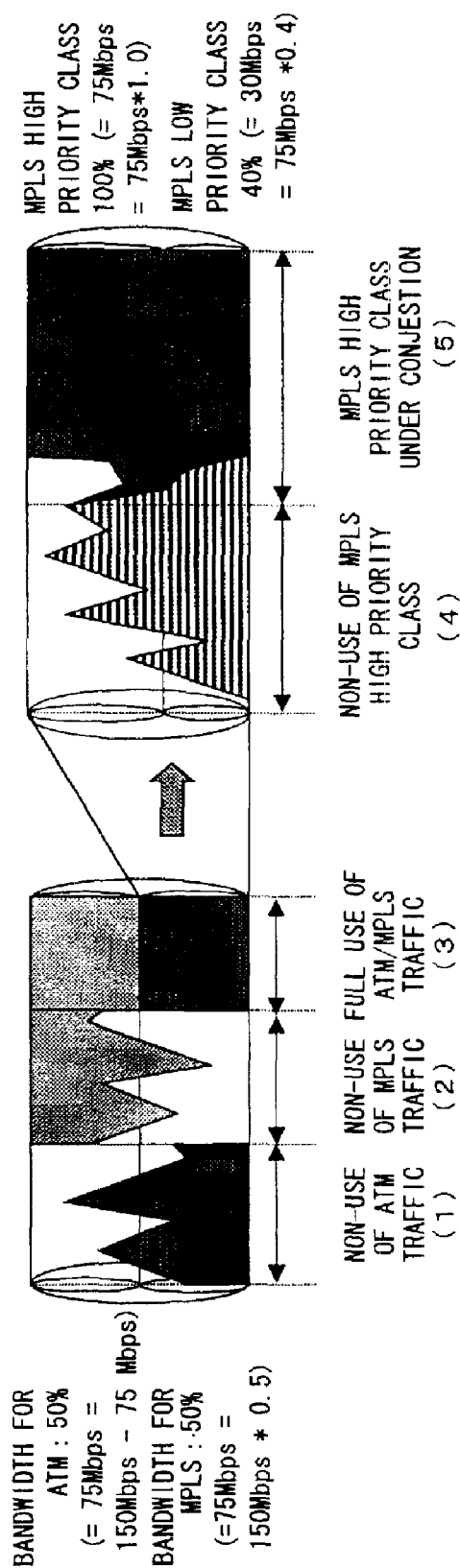
FIG. 11 is a diagram illustrating a usage example (2) of a bandwidth for an ATM traffic and an MPLS traffic in an ATM switch according to the present invention.

An example of the former case where the total of the bandwidths Ri exceeds "1" is shown in FIG. 11.

Namely, in this example, two classes of bandwidths for the MPLS are provided as a high priority class and a low priority class, so that the total of the two classes is assumed to be 1.4 which exceeds 1 with Ri=1.0 for the high priority class and Ri=0.4 for the low priority class.

As a result, among the states shown by (1)-(3) of FIG. 11 (corresponding to the bandwidth usage example of FIG. 8), as shown by (3) in FIG. 11, when the bandwidths for the ATM traffic and the MPLS traffic are both in the full use, the low priority class monopolize the allocated bandwidth as shown by (4) in FIG. 11 if the high priority class is unused in the MPLS traffic. However, the high priority class monopolizes the entire bandwidth as shown by (5) in FIG. 11 if the high priority class and the low priority class are conjested.

This is because the bandwidth allocation rate Ri=1 for the high priority class is used by step S28 of FIG. 10 so that the read interval Ti becomes small and the number of read is increased in the read algorithm shown in FIG. 6.

Figure 12:
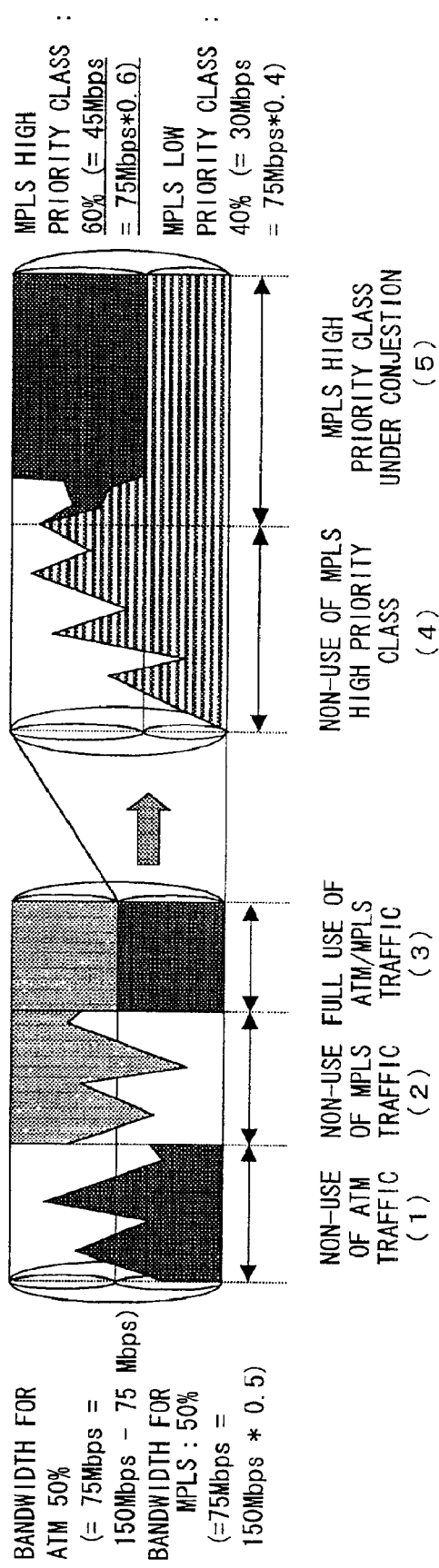
FIG. 12 is a diagram illustrating a usage example (3) of a bandwidth for an ATM traffic and an MPLS traffic in an ATM switch according to the present invention.
Figure 13:
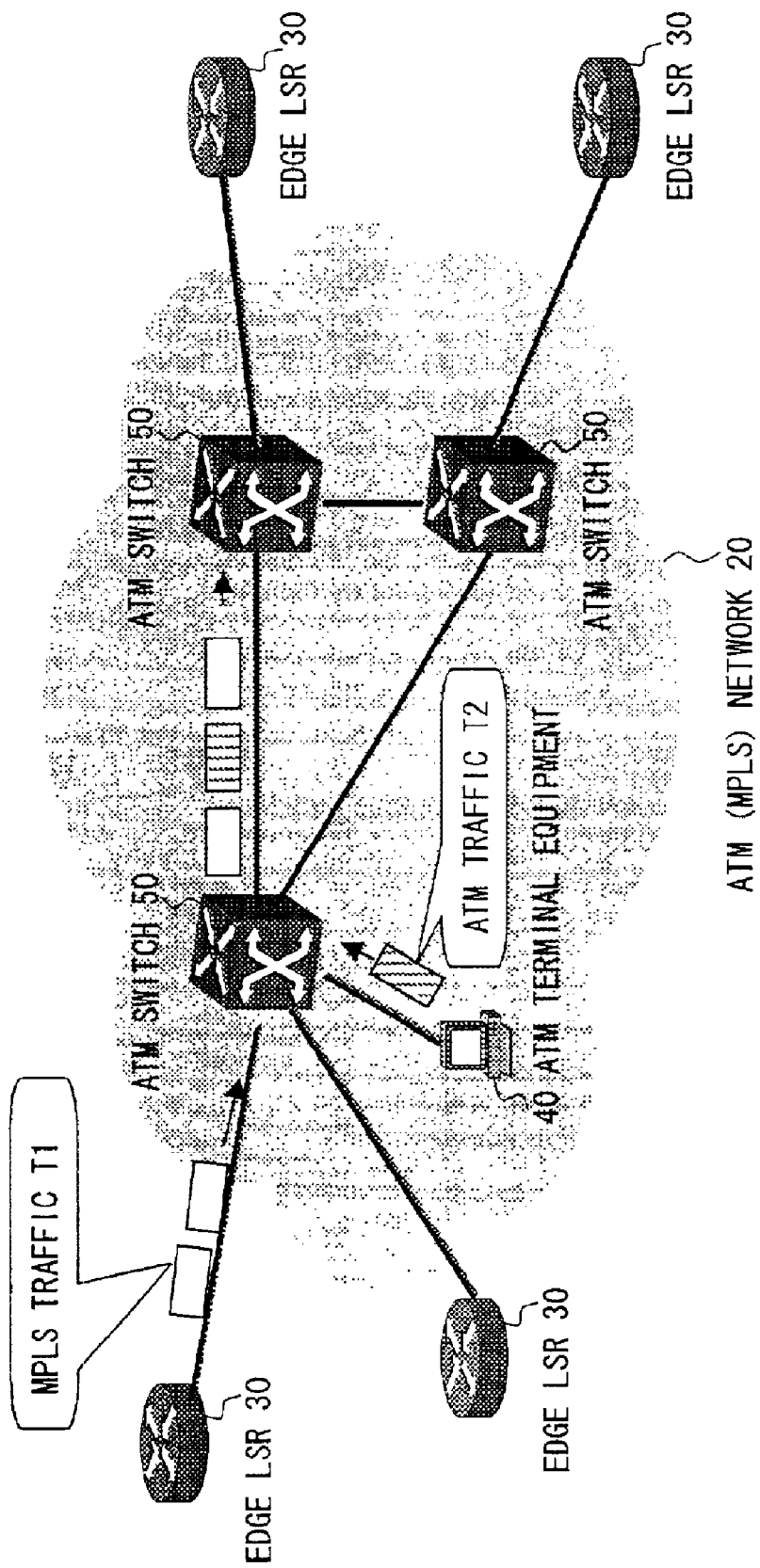
FIG. 13 is a diagram (1) illustrating a network arrangement according to the present invention and the prior art.

On the other hand, an example of the total of the allocated bandwidths Ri is set to become 1 is shown in FIG. 12.

In this example, if the ATM and the MPLS traffics are fully used as shown by (3) in FIG. 12, when the high priority class and the low priority class in the MPLS traffic are conjested as shown by (5) in FIG. 12, the bandwidths are occupied in the ratio of 60% and 40% respectively according to the allocated bandwidth Ri=0.6 of the former and the allocated bandwidth Ri=0.4.

It is to be noted that although in the example of FIG. 12, only two classes of service class for the MPLS are used for the sake of simplification, it is needless to say that a variety of classes can be used.

As described above, the ATM switch according to the present invention is arranged such that which of an MPLS traffic and an ATM traffic a received ATM cell belongs to is determined according to the cell, the cell is classified based on the determination result and made to wait, and the cell is read at read intervals based on preset bandwidth allocation rates of both traffics. Therefore, it is made possible to perform a bandwidth control at allocation rates respectively set for the traffics even if the MPLS traffic and the ATM traffic coexist.

Also, the ATM switch according to the present invention may be arranged such that service classes of a plurality of priorities for the MPLS traffic are provided and the read interval is obtained per priority, whereby a provision of a plurality of priorities and a bandwidth control for the priorities are made possible without using UBR of the ATM service category with respect to the MPLS traffic.

What we claim is:

1. An ATM switch provided in a network where an MPLS traffic and an ATM traffic coexist comprising:

a line interface, and a call processor, the line interface having:

determination means for determining, according to a received ATM cell, which traffic the cell belongs to, queuing means for queuing the cell classified based on a determination result of the determination means, and read means for reading the cell from the queuing means at read intervals based on bandwidth allocation rates of both traffics preset by the call processor, wherein the call processor performs a connection admission to read the cell when a total of a bandwidth demanded by a connection to be newly admitted for the MPLS traffic and a present bandwidth exceeds a bandwidth determined by the allocation rates, and otherwise rejects the connection admission.

2. An ATM switch provided in a network where an MPLS traffic and an ATM traffic coexist comprising:

a line interface, and a call processor, the line interface having:

determination means for determining, according to a received ATM cell, which traffic the cell belongs to, queuing means for queuing the cell classified based on a determination result of the determination means, and read means for reading the cell from the queuing means at read intervals based on bandwidth allocation rates of both traffics preset by the call processor, wherein the call processor performs a connection admission to read the cell unrestrictedly regardless of a bandwidth demanded by a connection to be newly admitted for the MPLS traffic.

3. An ATM switch provided in a network where an MPLS traffic and an ATM traffic coexist comprising:

a line interface, and a call processor, the line interface having;

determination means for determining, according to a received ATM cell, which traffic the cell belongs to, queuing means for queuing the cell classified based on a determination result of the determination means, and read means for reading the cell from the queuing means at read intervals based on bandwidth allocation rates of both traffics preset by the call processor, wherein the queuing means have service classes of a plurality of priorities for the traffics, and the call processor provides a bandwidth allocation rate varied per priority for the ATM traffic and a bandwidth allocation rate common to each priority for the MPLS traffic.

4. The ATM switch as claimed in claim 3 wherein the call processor sets the bandwidth allocation rates so that a total of the bandwidth allocation rates for the priorities exceeds 1.

5. The ATM switch as claimed in claim 3 wherein the call processor sets the bandwidth allocation rates so that a total of the bandwidth allocation rates for the priorities becomes 1.

6. The ATM switch as claimed in claim 3 wherein the read means read the cell according to another priority when the read interval is not reached in any of the service classes.

* * * * *